US008909740B1

(12) United States Patent  
Bliss et al.

(10) Patent No.: US 8,909,740 B1
(45) Date of Patent: Dec. 9, 2014

(54) VIDEO SESSION CONTENT SELECTED BY MULTIPLE USERS

(75) Inventors: Jason A. Bliss, Kent, WA (US); William Alexander Strand, Issaquah, WA (US); Luan Nguyen, Seattle, WA (US); Geoffrey E. Endresen, Everett, WA (US); Tal Stramer, Pittsburg, PA (US); Bethel Shawn McMillan, Renton, WA (US); Roy F. Price, Seattle, WA (US); Cameron Janes, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 690 days.

(21) Appl. No.: 12/702,842

(22) Filed: Feb. 9, 2010

Related U.S. Application Data

(63) Continuation-in-part of application No. 11/277,673, filed on Mar. 28, 2006, now Pat. No. 7,716,376.

(51) Int. Cl.
*G06F 15/16* (2006.01)
(52) U.S. Cl.
USPC ............................ 709/219; 709/227; 709/250
(58) Field of Classification Search
None
See application file for complete search history.

(56) References Cited

U.S. PATENT DOCUMENTS

| | | | |
|---|---|---|---|
| 5,475,835 A | 12/1995 | Hickey | |
| 5,694,163 A | 12/1997 | Harrison | |
| 5,808,662 A | 9/1998 | Kinney et al. | |
| 5,880,731 A | 3/1999 | Liles et al. | |
| 5,987,509 A | 11/1999 | Portuesi | |
| 6,154,600 A | 11/2000 | Newman et al. | |
| 6,661,496 B2 * | 12/2003 | Sherman et al. | 352/6 |
| 6,947,966 B1 * | 9/2005 | Oko et al. | 709/203 |
| 7,143,428 B1 * | 11/2006 | Bruck et al. | 725/37 |
| 7,590,554 B2 * | 9/2009 | Chen et al. | 705/7.28 |
| 7,757,250 B1 * | 7/2010 | Horvitz et al. | 725/35 |
| 8,032,914 B2 * | 10/2011 | Rodriguez | 725/97 |
| 2002/0120925 A1 | 8/2002 | Logan | |
| 2002/0128934 A1 * | 9/2002 | Shaer | 705/27 |
| 2003/0098869 A1 | 5/2003 | Arnold et al. | |
| 2003/0196198 A1 * | 10/2003 | Broussard et al. | 725/24 |

(Continued)

FOREIGN PATENT DOCUMENTS

JP 2004015750 A * 1/2004 ............ H04N 7/173

OTHER PUBLICATIONS

"VH1.com Shows: Pop-Up Video : Main page," http://www.vh1.com/shows/dyn/pop_up_video/series.jhtml, retrieved from Internet on Sep. 8, 2005, 2 pages.

(Continued)

*Primary Examiner* — Viet Vu
*Assistant Examiner* — Keyvan Emdadi
(74) *Attorney, Agent, or Firm* — Lee & Hayes, PLLC

(57) ABSTRACT

Systems and methods enable users to exchange content, such as chat text, with other users that are consuming like video media. In one implementation, several users collectively group together to form a video session. The video media played during the video session may be selected by a vote of the users. The users in the video session each consume the same video media, and the video media is played on individual user computer devices in a synchronized manner. The users send chat text to one another over a network using a computer user interface. The chat text is superimposed over the synchronized video running on the individual user computer devices.

27 Claims, 10 Drawing Sheets

(56) References Cited

U.S. PATENT DOCUMENTS

| | | |
|---|---|---|
| 2003/0212996 A1 | 11/2003 | Wolzien |
| 2004/0103444 A1 | 5/2004 | Weinberg et al. |
| 2004/0268386 A1* | 12/2004 | Logan et al. .................. 725/34 |
| 2005/0091694 A1 | 4/2005 | Rambo |
| 2006/0036703 A1* | 2/2006 | Fulmer et al. ................ 709/207 |
| 2006/0161621 A1* | 7/2006 | Rosenberg ................... 709/204 |
| 2006/0161952 A1* | 7/2006 | Herz et al. ..................... 725/46 |
| 2006/0173974 A1* | 8/2006 | Tang ............................ 709/217 |
| 2006/0277457 A1* | 12/2006 | Salkind et al. ................ 715/512 |
| 2007/0276902 A1* | 11/2007 | Jung et al. .................... 709/203 |
| 2007/0283403 A1* | 12/2007 | Eklund et al. ................ 725/117 |

OTHER PUBLICATIONS

"Watch Free, Live Internet Television—The ManiaTV! Network," http://www.maniatv.com, retrieved from Internet on Sep. 8, 2005, 3 pages.

* cited by examiner

VIDEO SESSION CONTENT SELECTED BY MULTIPLE USERS

RELATED APPLICATION

The present application is a continuation-in-part of pending U.S. application Ser. No. 11/277,673, filed on Mar. 28, 2006, entitled "Synchronized Video Session with Integrated Participant Generated Commentary." This pending application is herein incorporated by reference in its entirety, and the benefit of the filing date of this pending application is claimed to the fullest extent permitted by 35 U.S.C. §120.

BACKGROUND

Broadcast television reaches viewers across the globe. The signals belonging to broadcast television normally include video and audio signals that are selected by an entity delivering the signals. Recipients of broadcast signals cannot actively interact with the received signals; the media is generally passive in character and substance. Accordingly, broadcast television is often treated as background noise if there is nothing of interest currently broadcast. Alternately, a broadcast television recipient may simply turn off a television if the received broadcast programs are of no interest. Video media on DVDs and other repayable technology generally has the same passive character and substance as broadcast television.

At least one existing technology attempts to enrich video media. In particular, television broadcasters may advertise Websites that television viewers can access to retrieve information related to television shows, advertisements, etc. Frequently, these Websites are included as part of the broadcast signals. This type of video media enrichment normally necessitates the use of a separate device (e.g., computer) to gain access to the Websites. This practice can result in information overload, or the loss of interest in a television show that includes the Website references.

SUMMARY

Features that enhance users' experience during consumption of video media are described. Such features enable a user to exchange content, such as chat text, with other users that are consuming like video media. In one implementation, several users collectively group together to form a video session. The users in the video session each consume the same video media, and the video media is played on individual user computer devices in a synchronized manner. The users send chat text to one another over a network using a computer user interface. The chat text is superimposed over the synchronized video running on the individual user computer devices.

In one implementation, the video media may be selected by a vote of the users. The video selected by the vote may be offered and consumed for free or for a reduced price.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to systems and methods intended to enhance video media. In one implementation, video media is enhanced by allowing a group of users to interact as they view the video media. Interactions between users in the group may be over a network, such as the Internet. Various content, such as chat, may be shared between users in the group. Another content example is audio and video clips.

A central authority, such as a session host or Website, may be used synchronize video media played on users' computers. The central authority may also include video media that may be downloaded by the users' computers. Like or the same video media locally accessible by the users' computers are synchronized by the central authority before users can interact with other users. Synchronization of like video media playing on the users' computers generally ensures that interactions between the users are contextually relevant.

In some implementations, the video media made available to the users by the central authority is selected in advance based on a vote of the users. The central authority or another entity may solicit the votes of the users before playing the selected video media at a predetermined future time. For instance, the central authority may allow the users to vote for a movie of several movie choices to view on a particular night of the week. The central authority may then stream or otherwise make the selected movie available for viewing on the particular night of the week.

The central authority may charge a fee for accessing the video media. That fee may be waived or reduced in some instances when users access the video media during the predetermined future viewing time, such as the chosen night of the week.

The systems and methods intended to enhance video media may be implemented a number of ways. One example implementation is provided below with reference to FIGS. 1-10, as described below.

System Environment

Figure 1:
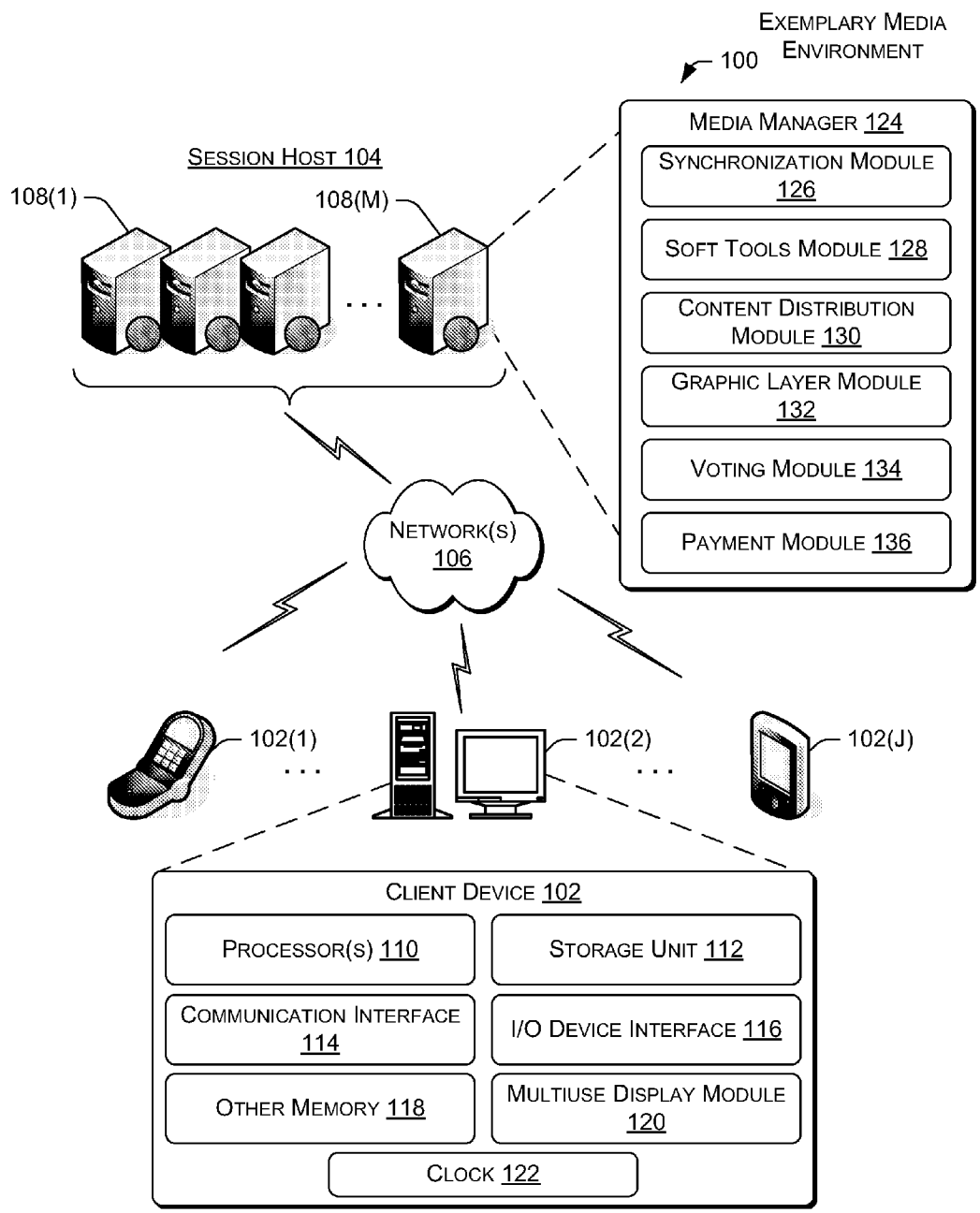
FIG. 1 illustrates an example media environment in which a plurality of users, using user computer devices, may interact with each other as they consume like video media. Interactions between the various uses may be in the form of text that is input and communicated over a network using a user computer device.

FIG. 1 illustrates an example media environment 100 in which a plurality of users, using user computing devices 102, may interact with each other as they consume like video media. In some instances, the users may vote on a particular video media to consume at a particular time. In the environment 100, many user computing devices 102(1), ..., 102(J) can access a session host 104 via a network 106. The network 106 is representative of many different types of networks, such as cable networks, the Internet, wireless networks, or a combination of such networks. The session host 104 is hosted on one or more servers 108(1), ..., 108(M), perhaps arranged as a server farm. Other server architectures may also be used to host the session host 104. The session host 104 is capable of handling requests from many users and serving, in response, various information and data to the user computing devices 102. The session host 104 is representative of essentially any site supporting user interaction, including online e-commerce entities offering downloadable media, and so forth.

The user computing devices 102 (also referred to as "client computers," "client devices," or simply "clients") are illustrated as a wireless phone, a personal computer, and a portable digital assistant (PDA), but may also be implemented as other devices, such as a television set, a television set-top box, a game console, a laptop computer, and so forth. Each user computing device 102 is equipped with one or more processors 110 and a storage unit 112 to store applications and data. The computing devices 102 also include a communication interface 114 that enables communication with the network 106 and other devices that may be connected to the network 106. The devices 102 are outfitted with an input/output (I/O) interface 116 that enables connection with various conventional computing peripherals. Additional memory 118 and a multiuse display module 120 are also employed by the user computing devices 102. The client device 102 may also have a clock 122, which may be hardware or software realized. Several components of the devices 102 will be discussed in further detail later in this description.

The user computer devices 102 may be located in different geographical locations across the globe. For example, a user may be using a computer device 102 in Germany; and another user may be using a computer device in Israel. Regardless of a location of a given computer device 102, the network 106 enables communication with the session host 104, as well as other devices that may be in communication with the network 106.

When users direct the computing devices 102 to request content from the session host 104, the devices 102 may send uniform resource locator (URL) requests to the servers 108. Upon receiving a URL request, the servers 108 return a Webpage back to a requesting client computer 102. The user computing device 102 invokes a browser to render the Webpage, allowing a user to interact with the Webpage. A returned Webpage may include links that enable a requesting client computer to download content stored and offered by the session host 104. Other user interfaces, such as dedicated applications implemented using software instructions and stored locally on a device 102, may be used to interact with the session host 104.

The session host 104 is configured to support providing downloadable video media for use on the user computing devices 102. The session host 104 also has facilities that support synchronizing playback of like video media stored in the computing devices 102.

A media manager 124 runs on one or more of the servers 108 to manage providing the downloadable video media and performing the synchronization features. The media manager 124 employs a synchronization module 126 used to synchronize like video media played on the client devices 102.

A soft tools module 128 includes downloadable computer-executable instructions that may be retrieved by the client devices 102. When executed on a client device 102, the instructions impart to the client devices 102 some of the synchronizing features of the synchronization module 126. The soft tools module 128 may also include downloadable computer-executable instructions that define a user interface that can be used by the computing devices 102 to play video media. Such a user interface may also allow users of the computing devices 102 to enter and communicate content to other computing devices 102 connected to the session host 104. Use of the soft tools module 128 on a client computing device is discussed later in this document.

The media manager 124 enables content exchange between client computers 102 that are playing like video media in a synchronized fashion. Such like video media playing in a synchronized fashion is often referred to as synchronized like video media in this disclosure. Through the use of a user interface, users of the client computers 102 are able to create content that can be sent to the session host 104. The media manager 124 is equipped with a content distribution module 130 that communicates the received content to other users' computing devices 102 that are playing the synchronized like video media. A graphic layer module 132 of the media manager 124 may be used to format the received content, so that it may be properly combined with the synchronized like video media playing on the other users' computing devices 102. A voting module 134 may receive and tally votes from users including the users of the client computers 102. A payment module 136 of the media manager 124 may confirm payment of a fee for the video media or may, in some implementations, confirm that the video media is available for free.

In one example implementation, each user in a group of users utilizes a distinct client computing device 102 to interface with the session host 104. Successful communication allows access to the media manager 124. Using an appropriate user interface resident on each computing device 102, or served by the session host 104, the users request an instantiation of a joint video session. The requested video session is to include a recent broadcast television show. Other video media may be included in the video session as well. For example, a video session can support movies, educational video media, business events, concerts, and the like.

Through the communication session established with each of the computing devices 102, the media manager 124 verifies that the recent broadcast television show is locally accessible by the devices 102. This may be accomplished by way of a simple search of the storage units 112 and other memory 118 employed by the devices 102. If the device 102 employs removable medium and/or a removable device, for example a optical disc usable in an optical drive, (e.g., DVD drive), an external/internal hard drive(s), and/or a thumb drive, such technology may be searched as well to determine if the recent broadcast television show is locally accessible to the devices 102. If the recent broadcast television show is not locally accessible by any one of the devices 102, the media manager 124 may offer the show for download, streaming, or instruct the devices 102 to insert a DVD, or the like, that includes a recorded copy of the recent broadcast show.

Synchronization of the video locally accessible by the computing devices 102 is now possible. To achieve proper synchronization, the media manager 124 requests and gains control of the computing devices 102 participating in the joint video session. The synchronization module 126 facilitates the process of establishing control of the computing devices 102. The acquired control is voluntary. In other words, a user may instruct a respective computing device 102 to terminate the control obtained by the synchronization module 126.

A complete copy of the recent broadcast television show is not required to be locally accessible by the computing devices 102. To synchronize properly, only the first few video segments or frames (e.g., a few minutes) of the recent broadcast television show may be locally accessible by the computing devices 102 that are part of the video session. Therefore, if a participating computing device 102 does not have local access to the recent broadcast television, the computing device 102 may request and begin to download the show. Before the download is complete, the media manager 124 may use the synchronization module 126 to synchronize the recent broadcast television show locally accessible by each participating computer device 102.

After the synchronization module 126 has control of the computing devices 102 participating in the video session, initiation of synchronized video may commence. Simultaneously, the synchronization module 126 starts the recent broadcast television show locally accessible by each computing device 102. The client devices 102 are now playing the recent broadcast television show simultaneously. The synchronization module 126 may send out periodic re-syncing signals to the client devices 102 to ensure the recent broadcast television show remains synchronized on each of the client devices 102.

Video synchronized on the client devices 102 provides an environment in which users of the respective client devices 102 may exchange commentary and other content while consuming the synchronized video. To that end, the media manager 124, aided by the content distribution module 130 and the graphic layer module 132, is designed to distribute content produced by users of the client devices 102 that are participating in the video session.

A user of one of the participating client device 102 uses a user interface to input commentary. Upon instruction to do so, the client device 102 sends the commentary to the session host 104 via the network 106. The commentary is formatted into a graphic layer by the graphic layer module 132. More specifically, the commentary may be integrated with a substantially transparent layer that can be superimposed over video media. The graphic layer is communicated to the other computing devices 102 participating in the video session. As an alternative, the module 132 may package the commentary with instructions that may be used by a participating client device 102 to render a graphic layer that includes integrated commentary. Such instructions may include translucency particulars of both the graphic layer, positioning of the commentary in the layer, color attributes of the commentary, translucently particulars of a text bubble. The multiuse display module 120 may be responsible for handling such a package delivered by media manager 124. In some implementations the commentary may be audio commentary that is integrated into audio of the video media. The audio commentary may comprise an always-on microphone connection between the participating client devices 102 such that the users can speak to each other while consuming the video media.

The graphic layer is superimposed over the video media playing on the computing devices 102 that are participating in the video session. A user interface of the computing devices 102, either resident at the devices 102 or supplied by the session host 104, performs the superimposing process. The graphic layer remains superimposed over the video media for a period of time. For example, if the graphic layer includes chat content contained in a chat bubble, the contents of the chat bubble may determine how long the graphic layer remains superimposed over the video media. Longer chat content will remain superimposed over the video media for a greater amount of time than shorter chat content. In one implementation, graphic layers that have chat content in excess of ten (10) words remain superimposed over video media for at least fifteen (15) seconds; graphic layers that have chat content with 10 or less words remain superimposed over video media for at least 10 seconds, but not greater than 15 seconds.

Media Manager Implementation

Figure 2:
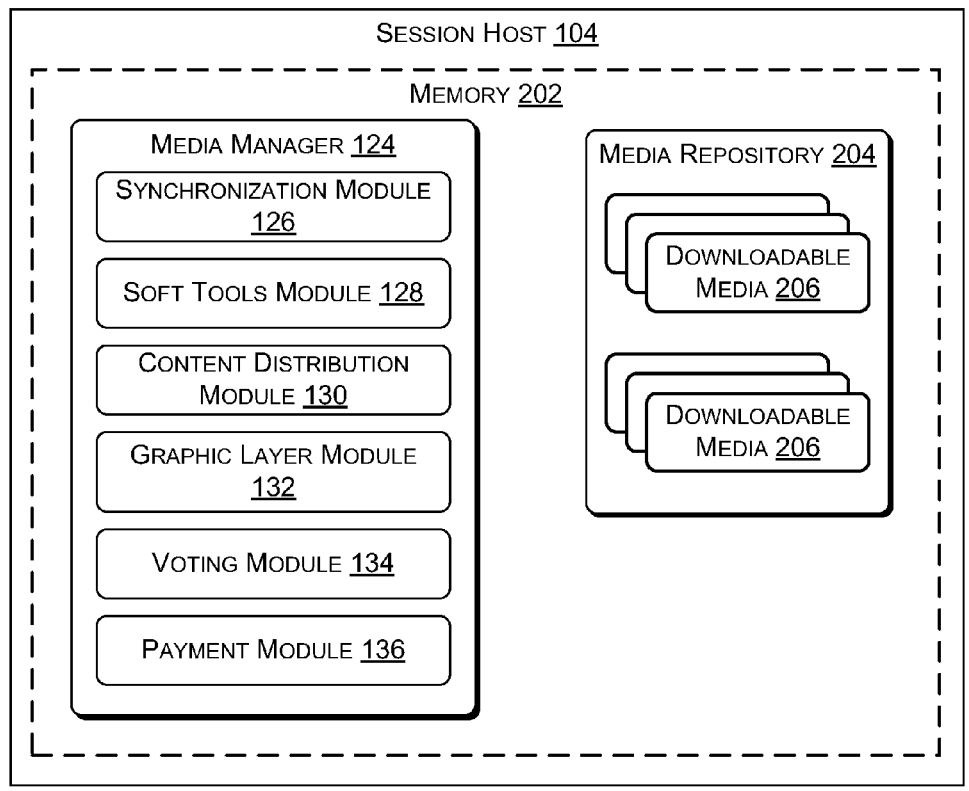
FIG. 2 is a block diagram illustrating modules and components employed by a server. The included modules and components may be used to manage a synchronized video session on various user computing devices.

FIG. 2 illustrates an example implementation of the media manager 124 that is implemented on one or more of the servers 108(1)-108(M). The servers 108 have processing capabilities and memory suitable to store and execute computer-executable instructions. In this example, the media manager 124 is implemented as software or computer-executable instructions stored in a memory 202 of the server(s) 108 and executed by one or more processors of the servers 108. The memory 202 may be implemented as non-removable persistent storage of the servers 108, although other suitable computer storage media may also be used to store the media manager 124. An example of a computer system is provided below with reference to FIG. 3.

The following description provides additional details related to the operational characteristics of the server 108 and the media manager 124.

There are various methods that the synchronization module 126 may use to synchronize video media playback on a client device 102 that may be collaboratively participating in a video session. In one implementation, the module 126 references a system clock (e.g., the clock 122) on each of the participating client devices 102. Here, the synchronization module 126 may need to consider the different time-zone locations of the participating client devices 102. Additionally, if some or all of the system clocks referenced differ by a number of seconds or even minutes, the module 126 considers/reconciles these discrepancies as well. The synchronization module 126 then issues a video playback start time to each of the client devices 102 participating in the video session based on the foregoing considerations. A user interface, either resident on the client devices 102 or provided by the host 104, initiates playback of the video media when the start time is reached. In another implementation, the synchronization module 126 sends a "play" command to each of the client devices 102 participating in the video session. The communication of such a command may occur after verifying that each of the client devices 102 includes the like video media for playback in the video session.

The synchronization module 126 is also capable of ensuring playback of synchronized video locally accessible by the client devices 102 remains substantially synchronized over the duration of a given video session. To achieve this, the module 126 may issue periodic re-sync signals or commands to each of the client devices 102 participating in a video session. Such periodic re-sync commands may identify a video frame or timing intrinsic to the synchronized video. Each of the participating client devices 102 uses these periodic re-sync commands, if necessary, to fast-forward or rewind the synchronized video.

The soft tools module 128 includes downloadable computer-executable instructions that implement a user interface that can display video media on one or more of the client devices 102. An example user interface is illustrated in FIGS. 4-7. The user interface also allows users to enter and send content/commentary (e.g., chat) to other user computer devices 102 participating in a video session. The instructions that implement the user interface may also impart functionality that allows the computer devices 102 to operate in a peer-to-peer networked arrangement. A computer device 102 equipped with a user interface imparted with peer-to-peer functionality is capable of hosting a video session that client devices 102 can join. A client device 102 including such a user interface would perform the synchronizing of the video media played on each of the participating client devices 102. Moreover, content and/or commentary exchanged between the client devices 102 participating in the video session is funneled through the hosting client device 102. Thus, such a hosting client device 102 is capable of the performing substantially all of the tasks discussed in connection with the host 104, and in particular, the media manager 124.

The content distribution module 130 works in conjunction with the graphic layer module 132 to deliver content, received from a client device 102, to other client devices 102 that are participating in a joint video session. A user may enter content using a user interface invoked on a client device 102. This content may be text chat data, audio data, video data, or the like. Upon user instruction to do so, the device 102 sends the entered data to the host 104.

The content distribution module 130 evaluates the content data received from the client device 102. If the content is audio or video content, the content distribution module 130 passes the content directly to the other client devices 102 participating in the video session. It is assumed that client devices 102 described herein have conventional technology for replaying audio and video. If the content is text chat data, the content distribution module 130 passes the data to the graphic layer module 132.

The graphic layer module 132 formats the text chat data as an integrated part of a video layer that may be superimposed over video media. In other words, a video layer generated by the graphic layer module 132 may be merged and combined with synchronized video media associated with a video session that includes a number of participating client devices 102.

In one implementation, the text chat data is integrated with a substantially transparent video layer. The substantially transparent video layer may, for example, include a speech bubble and/or idea bubble. The graphic layer module 132 inserts the text chat data in the speech bubble and/or idea bubble. In this manner, the bubbles may be translucent, or opaque elements positioned within an otherwise substantially transparent video layer. The inserted text chat data is appropriately colored to ensure readability when combined with the bubbles. Moreover, the bubbles may be spatially positioned in the substantially transparent video layer to avoid interfering with objects/people appearing in the video media the video layer is superimposed over. Layers having integrated bubbles are sent to client devices 102 participating in a video session. The received layers may be superimposed over video media.

The voting module 134 tallies voting results from a plurality of users. In some implementations, the voting may be weighted such that the vote of every user is not counted the same. The video media selected based on votes received by the voting module 134 may be distributed by the content distribution module 130.

The host 104 includes a media repository 204. Downloadable media 206 is stored in the media repository 204 and is available for download by the client devices 102. Example downloadable media 206 may include movies, television shows, sporting events, concerts, and other similar video media. The downloadable media 206 may be downloaded without charge, or may be premium content that requires a user of computing device 102 to submit payment information before the video media is downloaded. Any conventional online billing arrangement or method may be used to complete a purchase transaction for such premium video media. The payment may be processed by the payment module 136 resulting in the premium video media becoming unlocked and available to the user. In some implementations, the payment module 136 may determine whether or not payment is necessary and, if so, may determine a cost of the payment.

Example Computing Device

Figure 3:
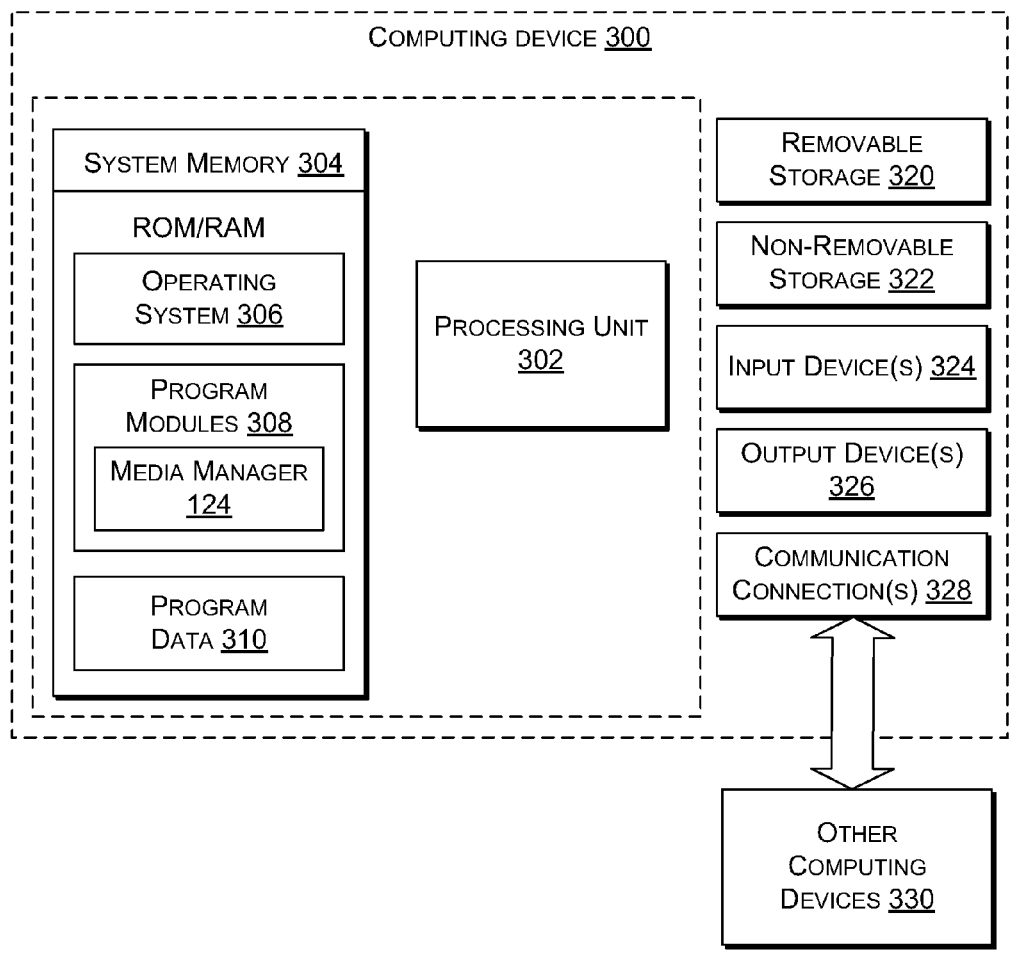
FIG. 3 is a block diagram illustrating functional components in a computing device that might be used to implement the clients or servers in FIG. 1.

FIG. 3 is an illustrative computing device that may be used to implement the servers 108(1)-108(M) and client computers 102(1)-102(J). In a very basic configuration, the computing device 300 includes at least one processing unit 302 and system memory 304. Depending on the exact configuration and type of computing device 300, the system memory 304 may be volatile (such as RAM), non-volatile (such as ROM, flash memory, etc.) or some combination of the two. The system memory 304 typically includes an operating system 306, one or more program modules 308, and may include program data 310. For the present implementations, the program modules 308 may include the media manager 124. As an alternative, the media manager 124 may be implemented as part of the operating system 306, or it may be installed on the computing device and stored in other memory (e.g., non-removable storage 322) separate from the system memory 306.

The computing device 300 may have additional features or functionality. For example, the computing device 300 may also include additional data storage devices (removable and/or non-removable) such as, for example, magnetic disks, optical disks, or tape. Such additional storage is illustrated in FIG. 3 by removable storage 320 and non-removable storage 322. Computer storage media may include volatile and non-volatile, removable and non-removable media implemented in any method or technology for storage of information, such as computer readable instructions, data structures, program modules, or other data. The system memory 306, removable storage 320 and non-removable storage 322 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of the device 300. Computing device 300 may also have input device(s) 324 such as keyboard, mouse, pen, voice input device, touch input device, etc. Output device(s) 326 such as a display, speakers, printer, etc. may also be included. These devices are well know in the art and need not be discussed at length.

The computing device 300 may also contain a communication connection 328 that allow the device to communicate with other computing devices 330, such as over a network like network 106 of FIG. 1. Communication connection(s) 328 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

User Interface

FIGS. 4-7 illustrate example user interfaces displayable on a display device interfaced with a client computer 102. Such a display device may be an appropriate computer display (e.g., an LCD or CRT display), a television, or the like. The user interfaces may be realized by computer-executable instructions stored in a memory 202 of the server(s) 108 and executed by one or more processors of the servers 108. Realized user interfaces may be communicated to client computers 102 over the network 106 in the form of Web pages or other network deliverable graphic formatted files. Alternatively, such computer-executable instructions may be stored in a storage unit 112 or other memory 118 of the client computer 102. The stored computer-executable instructions may be executed by the processor 110 and displayed on an appropriate display device interfaced with the client computer 102. Computer-executable instructions for realizing the user interfaces illustrated in FIGS. 4-7 may be downloaded from the media manager 124, and in particular, the soft tools module 128.

Figure 4:
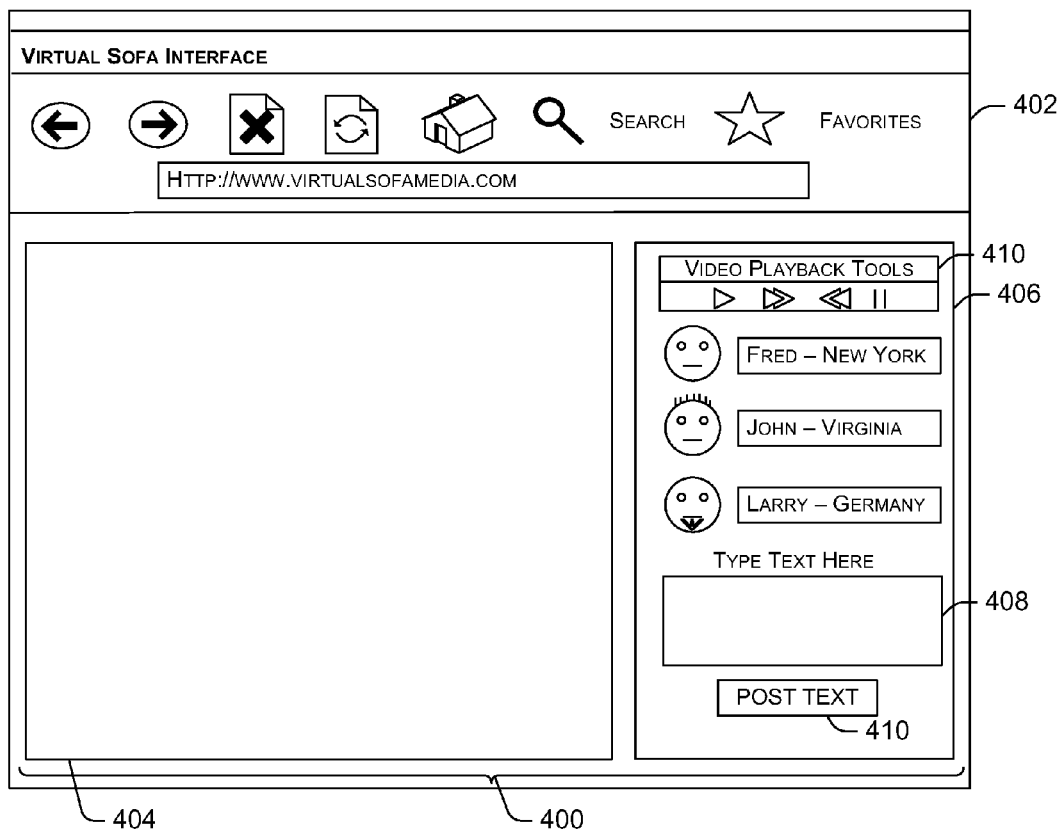
FIGS. 4-5 illustrate example user interfaces displayable on a display device interfaced with a client computer. Example client computers are illustrated in FIG. 1.

The example user interface 400 illustrated in FIG. 4 is shown in a Web browser window 402. The user interface 400 includes a video media window section 404 and a user participant window section 406. In some implementations, the user interface 400 may also include an advertising window section. Advertisements shown in the advertising window section may be related to the like video media and/or the chat text data. The advertisements may be localized for each client computer 102 based on references to a local calendar and/or a clock maintained on the client computer 102. The video media window section 404 may be used to display synchronized video media. The user participant window section 406 includes a text entry field 408 that can receive chat text data. Chat text data entered in the text entry filed 408, using an appropriate input device coupled to a client device 102, may be sent to other client devices 102 upon actuation of a button 410. For example, client devices 102 associated with a video session may receive the chat text data upon actuation of the button 410. The user participant window section 406 shows three active users (i.e., Fred, John and Larry). These users represent participants in a video session that includes like synchronized video being played on the participants' client devices 102. The uppermost participant in the window section 406, in this case Fred, represents the user interfacing with the user interface 400 shown in FIG. 4. The other listed participants, in this case John and Larry, are distant participants interfacing with their own respective user interface rendered using a client device 102.

The interface 400 also employs a video playback tools window 410. The video playback tools window 410 allows a user to control synchronized video playing in the video media window section 404. Use the playback tools of the tools window 410 may affect the synchronized video playing on client devices 102 associated with a video session. Actuating one or more of the playback tools sends a relevant command to the synchronization module 126. The command is forwarded to the other client devices 102 associated with the video session, which also perform the command. Therefore, if one participating client device 102 "pauses" the synchronized video, the command is forwarded to the other devices 102 to ensure the video playing on those devices is paused as well. If a large number of client devices 102 are playing the synchronized video, for example in an unrestricted or other large-scale broadcast, it may be impractical to allow every one of the numerous client devices 102 to pause the synchronized video. Therefore, in some implementations the "pause" functionality may disabled or the ability to pause may be limited to only a subset of the client devices 102. For example only one or more hosts, moderators, video media owners, and/or the like may be able to pause. In some implementations, "pause" functionality may be disabled or restricted when a number of client devices 102 playing the synchronized video exceeds a threshold number.

The participating client device 102 that initiates use of one or more of the playback tools of the tools window 410 may also send the synchronization module 126 a video frame and/or a particular timing intrinsic to the synchronized video that indicate when the playback tool was actuated. The synchronization module 126 may forward this information with the command for affecting playback of the synchronized video. This video frame and/or timing information are used to maintain synchronized playback of the synchronized video.

Figure 5:
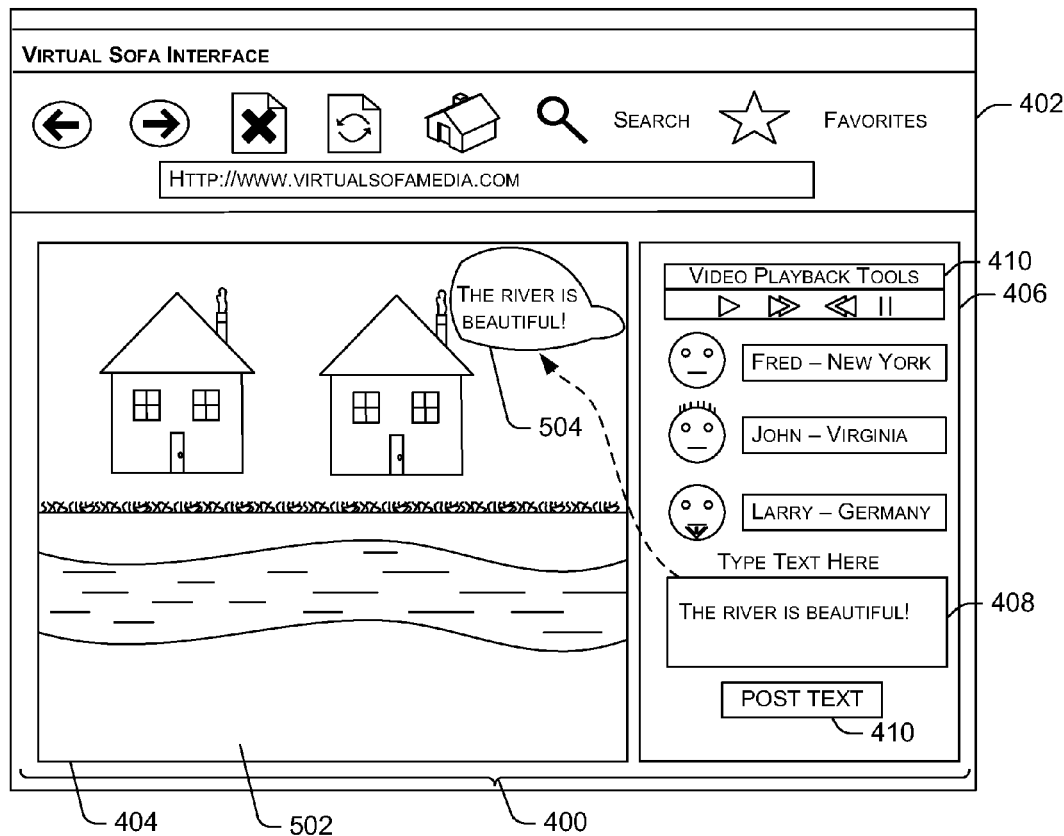

FIG. 5 illustrates the user interface 400 with synchronized video media 502. A chat bubble 504 is superimposed over the synchronized video media 502 that shows two homes along with a river. Here, Fred thinks the river is beautiful in this scene and wants to convey this to the other users. So, he types "The river is beautiful!" into the text entry field 408 and then posts the text by actuating the button 410. The chat bubble 504 is part of a substantially transparent video layer generated when the user Fred entered the displayed chat text into the text entry filed 408 and the button 410 was actuated. The substantially transparent video layer including the chat bubble 504 is also superimposed over synchronized media 502 available to John and Larry via their respective client devices 102. As was discussed hereinabove, the media manager 124 may be responsible for distributing the video layer that incorporates the chat bubble 504. In another implementation, a client computer 102 acting as host computer and possessing the same functionality of the media manager 124 may also distribute the video layer.

Figure 6:
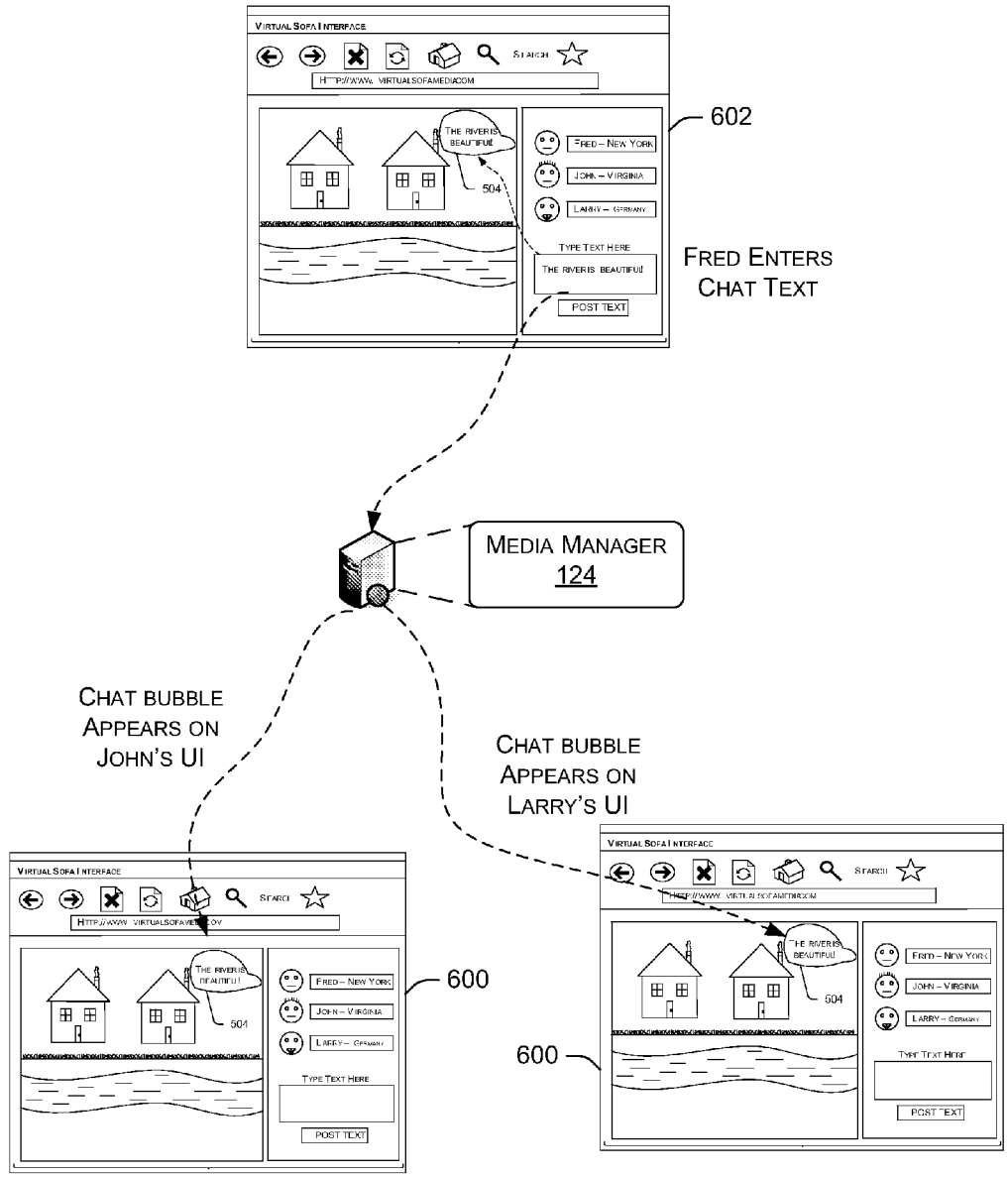
FIG. 6 illustrates an example of various users that have received commentary input by a user while viewing like video media played in a synchronized fashion.

FIG. 6 illustrates video layers 600, which incorporate the chat bubble 504, distributed by the media manager 124 to John and Larry. The video layers 600 may be displayed using a Web browser employed by respective client devices 102 belonging to John and Larry. The users illustrated in FIG. 6 may be in communication through a server, or the users may be communication in a peer-to-peer arrangement. A video layer 602, on Fred's client device 102, also includes the chat bubble 504. The chat entered by Fred need not pass through the media manager 124; Fred's client device 102 handles the rending and display of the video layer 602.

Figure 7:
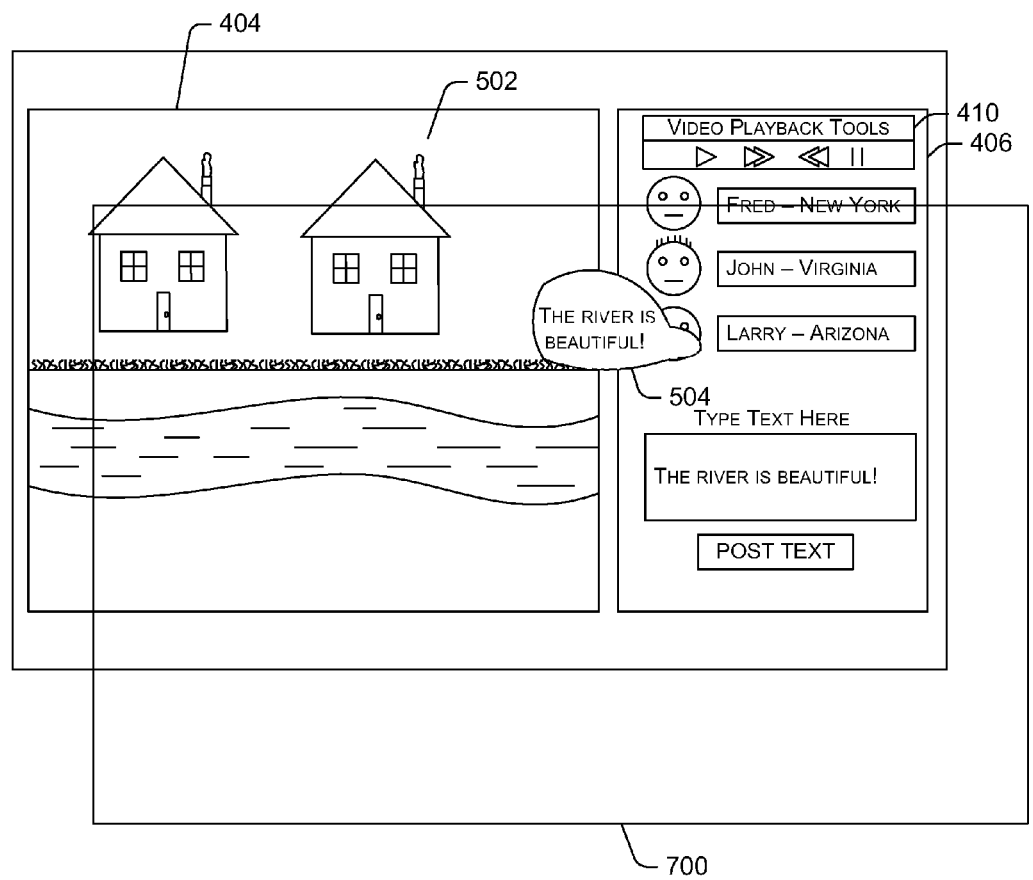
FIG. 7 illustrates an example video layer that may be superimposed over synchronized video media.

FIG. 7 illustrates an example video layer 700 that may be superimposed over the synchronized video media 502. The video layer 700 is show as comprising the chat bubble 504. The video layer 700 is translucent, yet the chat bubble 504 is opaque. Therefore, the video layer 700 will not conceal the substance of the synchronized video media 502 when the layer 700 is superimposed over the media 502. The video layer 700 may be many different sizes and shapes; the translucency may vary; and the chat bubble 504 may have a different format, size, color, and shape.

Operation

Figure 8:
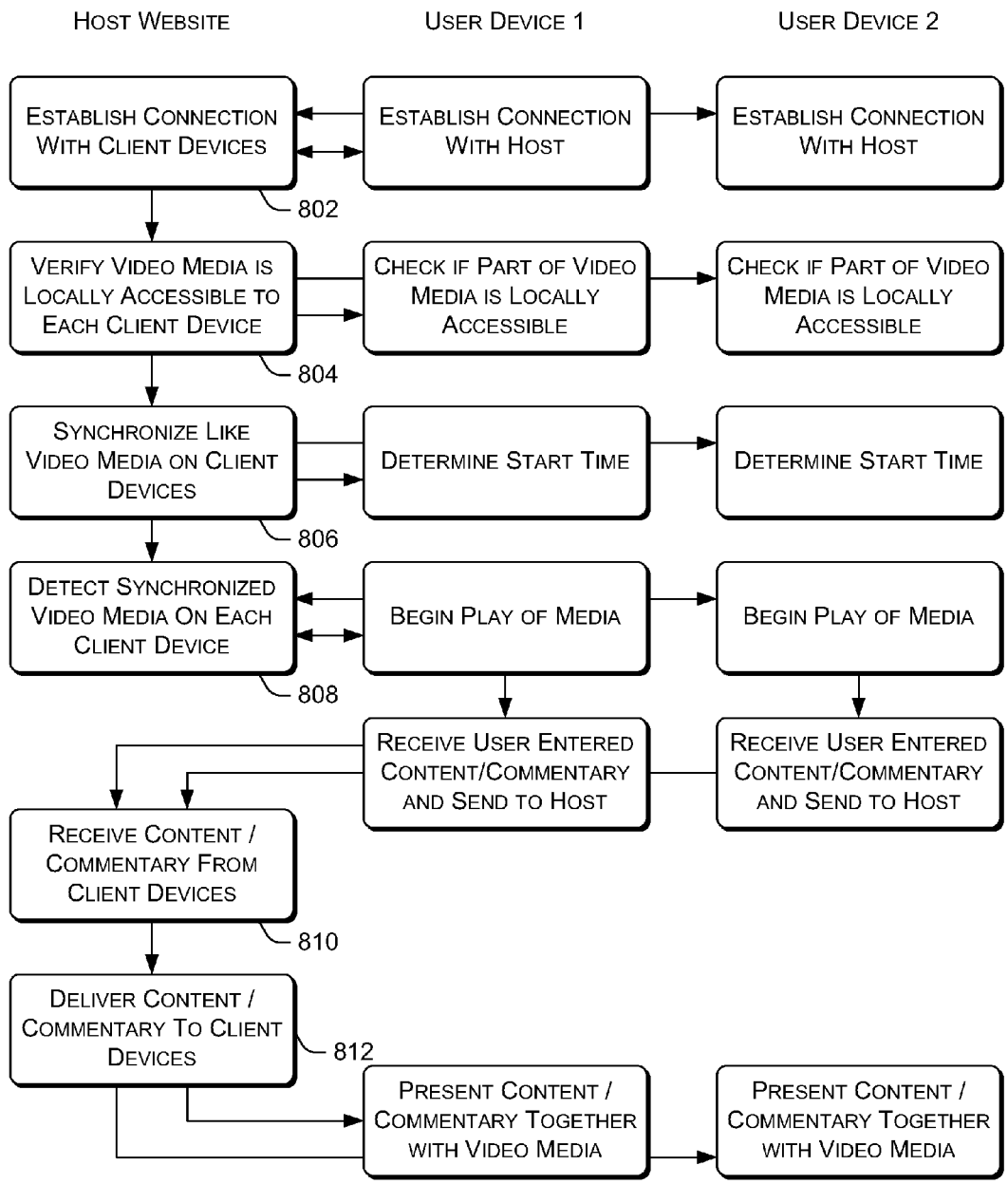
FIG. 8 is a flow diagram of a process for establishing and hosting a video session common among a plurality of computing devices.
Figure 9:
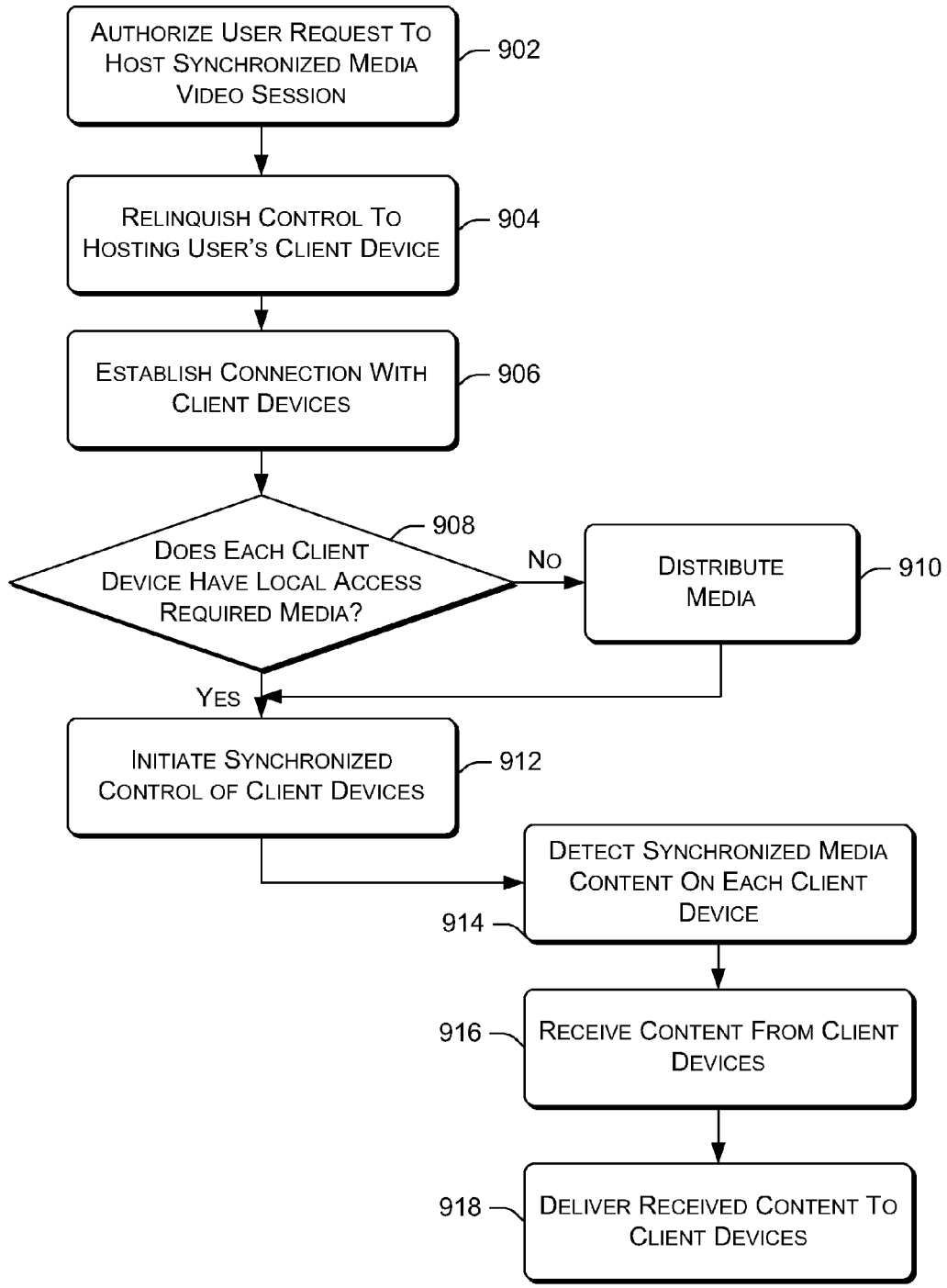
FIG. 9 is a flow diagram of a process for establishing and hosting a video session common among a plurality of computing devices. A client device hosts the video session common among the plurality of computing devices.

FIGS. 8-9 illustrate example processes for establishing a video session common among client devices. Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes may be described with reference to the example media environment 100 of FIG. 1, and the media manager 124 described with reference to FIGS. 1 and 2. In particular, many acts described below may be implemented and performed by the media manager 124, and its components and modules, illustrated in FIGS. 1 and 2. If specific reference is not made to the environment 100 and the media manager 124, it is to be assumed that a similar arrangement(s) having the features and capabilities described herein is executing the example processes illustrated in FIG. 8-9.

Users referred to in the following, as well as the foregoing, are generally interfacing with a client computer, or similar computing device, of the type described herein with reference to FIGS. 1-3. User interfaces referred to in the following, as well as the foregoing, are generally realized using a client computer of the type described herein with reference to FIG. 1-3.

FIG. 8 shows a general process for establishing and hosting a video session common among a plurality of computing devices. A session host, such as the session host 104 illustrated in FIG. 1, will act as a central authority or master for client devices requesting permission to participate as part of a video session. For clarity, interactions that may occur with two client devices (device 1 and 2) are shown in the figure. These client devices may be user computing devices 102.

At block 802, the session host establishes a connection with client devices that wish to participate in a video session. Some client devices might already be in communication with the session host. If so, the processing of block 802 would not apply to those already connected client devices.

At block 804, the session host verifies that each of the participating client devices currently has local access to the video media that will be played, in a synchronized manner, on each of the client devices. Storage and memory of the client devices may be searched to determine the existence of the video media. Removable medium and/or a removable device, for example a optical disc usable in an optical drive, (e.g., DVD drive), an external/internal hard drive(s), and/or a thumb drive, may be searched as well. Other ways of determining the existence of the video media may be used as well. If one or more of the participating client devices does not have the required video media, the video media may be offered to those devices via download.

At block 806, the like video media locally accessible by each of the participating client devices is synchronized. In one implementation, the media manager 124 observers and reconciles time clocks at each of the participating client devices. This may include taking into consideration the various time-zones of the participating client devices and/or the time variances of the clocks. Then, based on the foregoing considerations, the media manager 124 issues a video media playback start time to each of the participating client devices. When that time comes, the participating client devices individually start playback of the video media. In another implementation, the media manager 124 may issue a play command to each of the participating client devices instructing the devices to start playback of the video media. The media manager 124 may periodically issue re-sync commands to the participating client device to ensure the video media remains synchronized.

At block 808, the media manager 124 solicits a response from each of the participating client devices confirming playback of the video media. Here, the media manager 124 may poll the participating client devices and request a confirmation message that the playback has commenced. Alternatively, the media manager 124 may make an inquiry of each participating client device to see if playback of the video media is currently active. Once playback is confirmed, at block 810, the media manager 124 is now ready to receive content/commentary from the participating client devices. Such received content/commentary may include chat text data, audio and video media, and so forth.

At block 812, the media manager 124 delivers received content/commentary to the participating client devices. The client device that sent the content/commentary does not receive the delivery. In the case of audio and/or video media received by the media manager 124, such media may be passed to the participating client devices without undergoing additional processing. However, chat text data should be formatted before it is delivered to the participating client devices. In particular, the chat text data is integrated with a graphic layer that can be superimposed over the video media. The graphic layer is sent to the participating client devices and used together with the video media. Generally, the graphic layer is displayed over the video media for predetermined timeframe and is then removed.

The instructions of blocks 810 and 812 are available during an entire video session that includes a plurality of client devices playing synchronized like video media. The like video media may include television shows, movies, educational content, recorded concerts, sporting events, and so forth.

FIG. 9 shows a general process for establishing and hosting a video session common among a plurality of computing devices. In this figure, a client device hosts the video session common among the plurality of computing devices, where the hosting device and the plurality of computing devices are networked together in a peer-to-peer format.

At block 902, the session host 104 authorizes a user's request to host a video session that includes synchronized video played on a plurality of client computing devices. Part of the authorization process may comprise verifying that the requesting user's client device includes an application that enables the device to synchronize video media on client devices participating in a video session. Such an application may be retrieved from the media manager 124 if necessary. In particular, as was discussed earlier, the soft tools module 128 includes downloadable computer-executable instructions that enable a client device with the same functionality as the media manager 124.

At block 904, the session host 104 relinquishes control to the requesting user's client device. The session host 104 may still be in active communication with the client device, however. The active communication may be required if one or more of the client devices participating in the video session require the like video media that will be played on the devices during the video session. At block 906, if a connection is not already in place, the hosting client device establishes a connection with the client devices participating in the video session. The connection between the computing devices is possible using the network 106.

At block 908, the hosting client device verifies that each of the participating client devices currently has local access to the video media that will be played, in a synchronized manner, on each of the client devices. Storage and memory of the client devices may be searched to determine the existence of the video media. Removable medium and/or a removable device, for example a optical disc usable in an optical drive, (e.g., DVD drive), an external/internal hard drive(s), and/or a thumb drive, may be searched as well. Other ways of determining the existence of the video media may be used as well. At block 910, if one or more of the participating client devices does not have the required video media, the video media may be offered to those devices via download. The session host 104 is responsible for distributing the required video media. The hosting client device may also distribute the required video media if authorized to do so.

At block 912, like video media locally accessible by each of the participating client devices is synchronized. In one implementation, the hosting client device observers and reconciles time clocks at each of the participating client devices. This may include taking into consideration the various timezones of the participating client devices and/or the time variances of the clocks. Then, based on the foregoing considerations, the hosting client device issues a video media playback start time to each of the participating client devices. When that time comes, the participating client devices individually start playback of the video media. In another implementation, the hosting client device may issue a play command to each of the participating client devices instructing the devices to start playback of the video media.

At block 914, the hosting client device solicits a response from each of the participating client devices confirming playback of the video media. Here, the media manager 124 may poll the participating client devices and request a confirmation message that the playback has commenced. Alternatively, the media manager 124 may make an inquiry of each participating client device to see if playback of the video media is currently active. Once playback is confirmed, at block 916, the hosting client device is now ready to receive content from the participating client devices. Such received content may include chat text data, audio and video media, and the like.

At block 918, the hosting client device delivers received content to the participating client devices. The client device that sent the content does not receive the delivery. In the case of audio and video media received by the hosting client device, such media may be passed to the participating client devices without undergoing additional processing. However, chat text data should be formatted before it is delivered to the participating client devices. To that end, the chat text data is integrated with a graphic layer that can be superimposed over the video media. The graphic layer is sent to the participating client devices and used in together with the video media. Generally, the graphic layer is displayed over the video media for predetermined timeframe and is then removed.

The instructions of blocks 916 and 918 are available during an entire video session that includes a plurality of client devices playing synchronized like video media. The like video media may include television shows, movies, educational content, recorded concerts, sporting events, or the like.

Community Voting

In implementations where the media manager 124 includes a voting module 134, the video media discussed above may be determined by a vote rather than the choice of a single user or a central authority. A list of video media may be presented to users for a vote on which of the video media the users wish to view. Each user may vote through a user interface provided on his or her respective computing device 102. In some implementations, the users may be presented with a web-based list of multiple different video media and the central authority receives the votes from users via the web-based list. The voting may also be conducted by other mechanisms such as sending an e-mail or text message indicating which of multiple different video media the user wishes to view. In some implementations each user has one vote and the video media receiving a largest number of votes from the users is selected.

In other implementations, the votes of different users may be weighted differently so that the video media receiving the largest number of votes is determined based on the weight of the votes. For example, users with premium accounts with the central authority providing the video media, users that have paid a premium fee to have their votes counted more, users that have purchased video media from the central authority in the past, users that have voted in a previous "election" for video media, and the like may have a greater weight attributed to their votes. The weighting may also include progressive weighting or different degrees of weighting. For example, the weight of a user's vote may be proportional to the premium fee, an amount of money spent or a number of video media purchased. In other words, a user that has spent $40 in the last month may have his or her vote weighted more than (e.g., twice as much as) a user who spent $20. Similarly, a user that purchased 10 video media products in the past year may have his or her vote weighted ten times more than the vote of the user who purchased only one video media product in the past year.

In the same or different implementations, eligibility to vote may be determined by factors including the same factors used to weight votes. For example, only users that have spent over a threshold amount of money or purchased more than a threshold number or video media products may vote. Other eligibility requirements are also possible. Voting could incur a voting charge either to a user account, a credit card, or the like. A small charge (e.g., $0.01-$0.10) could support a monetization model for the central authority to provide a "free" movie. Additionally, the small charge may discourage insincere voting or virtual ballot stuffing. Voting could also be limited to only those users that had purchased a certain item. In one example, voting to choose a science fiction movie may be limited to only those users who had previously purchased another science fiction video media.

The list of video media may be some subset of all available video media offered by the central authority. Each video media item in the list of video media may have a common attribute such as genre, actor, rating, release date, language, price, resolution, length, and/or the like. In some implementations the list of video media items may include "new releases." For example, the voting may be between only video media items released in the last two weeks, one month, etc. In additional implementations, the common attribute may be inclusion in a favorites list or recommendation list. For example, several favorites lists of the user and of the user's friends may be used to create the list of video media for voting upon by the users. The favorites lists and/or the identity of the user's friends may be, in some implementations, identified by social information of the user such as data from a social networking site. The recommendation list may include recommended video media based on the user's past viewing or purchasing history. An algorithm may be applied to determine which video media to recommend. As an additional example, a friend's viewing history may be the basis for the recommendation list. In other implementations, the list of video media may be created differently such as by random selection and/or inclusion of popular or best-selling video media. The voting module 134 of the media manager 124 may create the list of video media.

Following a tally of the votes, a video media is identified as the video media receiving a largest number of votes and is presented to the users at a predetermined time. In some implementations, a group of friends in different locations coordinating a virtual movie session may begin viewing of the selected video media shortly after voting is completed, such as within one hour of the voting. In other implementations, the selected video media is made available to any user of network 106. Here, viewing of the video media may not begin until several hours or days after voting has ended, such as on a predetermined time of a predetermined day. In either of the above implementations, voting may only be allowed during a discrete period of time (i.e., there is a defined start and end time during which votes may be cast). The video media selected by the voting may be identified shortly after voting ends, or the video media may not be identified until viewing begins.

In some instances, the selected video media may be made available for a reduced fee or for free at the predetermined time, to all users, to users who voted, to all user who voted for the video media item that was ultimately selected, or to some other subset of the users. This may create an incentive for a user to wait the hours or days to view the video media selected by the voting at the predetermined time. For example, the selected video item may be available for viewing on demand at any time for a normal fee, but the video media that receives the most votes may be shown at the predetermined viewing time for free or for a reduced fee. In some implementations the video item that receives the second (or third, etc.) most votes may be shown at a later time. The video media may be available for on-demand viewing for no additional fee during a limited time after the broadcast at the predetermined time. Additional monetary incentives to watch the video media at the future viewing time may include promotions such as giving away a free copy of the video media (e.g., a video disk, a downloadable file, or the like) to a limited number of viewers, allowing all or some of the viewers to purchase a copy of the video media following the future viewing time for a reduced fee, and/or the like. Monetary incentives may also be selectively provided, such as for example, allowing those viewers who also voted from the winning video media to purchase it at a reduced fee, while not providing the same offer to those who voted for another video media. Alternatively, or additionally, those viewers who voted for another video media (i.e., one that did not win) may be able to buy that video media for a reduced fee. In still other instances, the incentives may be offered to each user that voted for any of the video media, while the incentives may not be offered to those users that did not vote at all.

Figure 10:
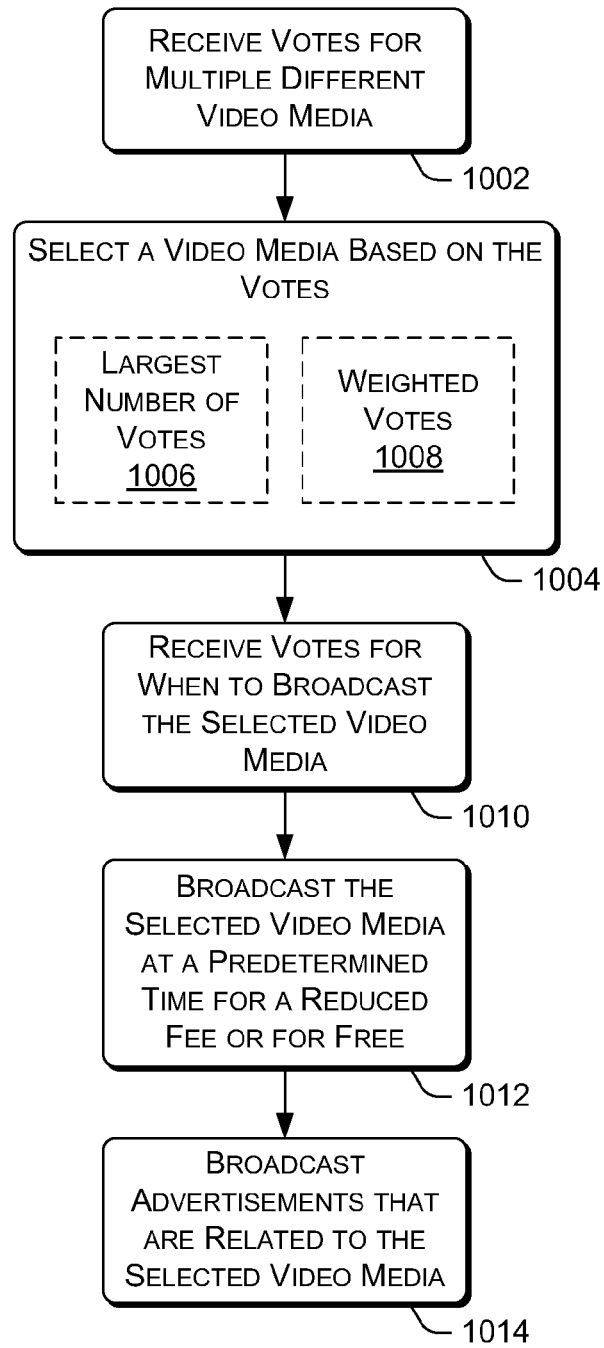
FIG. 10 is a flow diagram of a process for selecting and presenting video media.

FIG. 10 shows a general process for selecting a video media based on voting and presenting the video media. At block 1002, votes are received from each of multiple different users for a respective video media of multiple different video media. At block 1004, video media is selected from the multiple different video media based at least in part on votes received from the multiple different users. The voting may be open only to a limited group such as a defined community of friends, members of a social network, etc., or the voting may be open to any user. The users may vote for any video media, or may vote for one or more video media of a group of multiple predetermined video media. The selection of the video media based on the votes may, at block 1006, select the video media that receives a largest number of votes relative to a number of votes received for each other video media. Alternatively, at block 1008, the largest number of votes may be determined based at least in part on weighted votes where the weighting is based at least in part on a characteristic of a user that provides their respective vote. Optionally, at block 1010, votes from multiple different users for when to broadcast the selected video media are received and the predetermined time is selected based on the received votes. In some implementations, the users do not vote for the predetermined time. At block 1012, the selected video media is broadcast for viewing at the predetermined time without charge or for a fee that is less than a normal fee for viewing the selected video media at a time other than the predetermined time. The video media may be presented by broadcast over the network 106. The broadcast may be available to any user device 102 in communication with the network 106 as streaming media or as a downloadable file. Alternatively, the video media may only be broadcast to a predetermined group of viewers. This predetermined group of viewers may be the defined community of friends that participated in the voting. Even when the voting is open to any user, the video media may not always be broadcast to any user. For example, the predetermined group of viewers may be only those users who voted and users who did not vote may be excluded from the broadcast. In some implementations, only those users who voted for the winning video media may receive the broadcast. The broadcast may optionally include advertisements that are related to the selected video media in and broadcast conjunction with the selected video media as shown at block 1014. In some implementations, the selected video media may be broadcast without advertisements or advertisements may be unrelated to the selected video media.

In some implementations, the future viewing time may be predetermined before the voting begins. For example, the future viewing time may be 8:00 PM on Saturday evening and this may be known to all the users who cast votes. In other implementations, a viewing time may be selected by votes from the users. When a group of friends is voting on the video media to view, the group of friends may also vote for the date and time to view the video media. The choices of possible dates and times may be based in part on calendar information, such as from a social networking site, of each user in the group of friends. For instance, if one of the friends specifies the group of friends scheduled to watch the video media, the central authority hosting or otherwise offering the video media may consult a calendar of each of the friends (e.g., on a social networking site or otherwise) and may suggest a time for the friends to view the movie. Here, the friends may each grant the central authority access to the respective friend's calendar.

One member of the group of friends, or any other group, may wish to host a "movie night" to share video media with his or her friends. The video media owner may allow the video media to be broadcast to a large audience for free due to advertising revenue or for other reasons. However, presenting the video media to a smaller group, such as by limited broadcast to a group of friends, may not be economically feasible unless a fee is paid to consume the video media. One user may purchase the video media and invite other users to view the video media together. Purchase, or rental, of the video media may come with a number of sharing credits that allow a limited number of other users to be invited to watch the video media for free. The number of sharing credits available to be sent by the purchaser may increase if a larger fee is paid. Furthermore, the purchaser may receive a discount on the cost of the movie that increases as the user invites more users to participate in the viewing of the movie (and as such users pay a fee for this participation).

In some implementations, the purchaser and the other users who received an invitation from the purchaser view the video media at the same time. The synchronization module 126 of the media manager 124 may assist with synchronizing viewing of the video media. In other implementations, there may be a viewing window (e.g., a five hour period) during which the video media is available for consumption by the other users on an on-demand basis.

In some instances, the group of users may collectively share the cost of watching the synchronized video media. One illustrative way of sharing the costs while still having a primary "host" is for the host and the other users pay a fee. In some implementations, users that have pre-ordered the video media or purchased the video media shortly after release may pay a lower fee to be the "host" than another user who purchased the media item long after initial release.

The additional fee paid by the other users may be less than a fee paid by the user who is hosting, although it need not be. For example, one user pays five dollars and each additional user pays one dollar. The payment module 136 of the media manager 124 may determine the fee and may confirm which users have paid for the video media and/or which users have received a sharing credit to unlock the video media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system, comprising:
   one or more processors;
   memory, accessible by the one or more processors;
   a voting module stored in the memory and executable on the one or more processors to determine which video media from multiple different video media has received a largest number of votes from a plurality of users, the voting module further configured to determine a broadcast time to broadcast the video media based at least in part on votes received from the plurality of users;
   a content distribution module stored in the memory and executable on the one or more processors to broadcast the video media having received the largest number of votes to a plurality of computing devices at the broadcast time that is based at least in part on the votes received from the plurality of users, the content distribution module being further configured to offer a copy of the video media having received the largest number of votes exclusively to a subset of the plurality of users who voted for the video media having received the largest number of votes;
   a synchronization module stored in the memory and executable on the one or more processors to synchronize playback of the video media having received the largest number of votes among the plurality of computing devices during a synchronized playback session; and
   a commentary distribution module stored in the memory and executable on the one or more processors to distribute commentary generated by participants in the synchronized playback session to the plurality of computing devices.

2. The system as recited in claim 1, wherein each of the multiple different video media share a common attribute, the common attribute comprising: a rating, a release date, a language, a price, a resolution, or a length.

3. The system as recited in claim 1, wherein the content distribution module broadcasts the video media having received the largest number of votes at the broadcast time which is more than one hour after the voting module determines which video media has received the largest number of votes.

4. The system as recited in claim 1, further comprising a payment module stored in the memory and executable on the one or more processors to determine a price for the video media to be played back on one of the plurality of computing devices and to confirm receipt of a payment from the one of the plurality of computing devices or to confirm a free grant of viewing privileges to the one of the plurality of computing devices.

5. A computer-implemented method, comprising:
   under control of one or more computer systems configured with executable instructions,
   receiving a media vote from each of multiple different users for a respective video media of multiple different video media;
   receiving a timing vote from each of the multiple different users for one of a plurality of broadcast times to broadcast the respective video media;
   selecting a video media from the multiple different video media to broadcast at a broadcast time from the plurality of broadcast times based at least in part on the media vote and the timing vote received from the multiple different users;
   broadcasting the selected video media to multiple client computing devices at the broadcast time without charge or for a fee that is less than a normal fee for viewing the selected video media at a time other than the broadcast time; and
   offering a copy of the selected video media exclusively to a subset of the multiple different users who cast media votes for the selected video media.

6. The method of claim 5, wherein the selected video media is the video media that receives a largest number of media votes relative to a number of media votes received for each other video media of the multiple different video media.

7. The method of claim 6, further comprising weighting one or more of the received media votes based at least in part on a characteristic of a user that provides a respective media vote, and wherein the largest number of media votes is determined based at least in part on the weighted one or more received media votes.

8. The method of claim 7, wherein the characteristic of the user comprises having cast a vote for a previously broadcast video media, having paid a premium fee to view the selected video media, having paid a voting charge, having a premium account with a central authority providing the multiple different video media, or having previously purchased a video media product from the central authority.

9. The method of claim 7, wherein the weighting comprises weighting the one or more received media votes in proportion to an amount of a premium fee, an amount of money spent at a central authority, or a number of video media purchased from the central authority.

10. The method of claim 5, further comprising presenting a web-based list of the multiple different video media, and wherein the receiving of the media votes comprises receiving media votes from the web-based list.

11. The method of claim 10, wherein each of the multiple different video media in the web-based list have a common attribute, the common attribute comprising: a rating, a release date, a language, a price, a resolution, or a length.

12. The method of claim 5, wherein the broadcasting of the selected video media comprises broadcasting the selected video media to a predetermined group of client computing devices.

13. The method of claim 12, wherein the predetermined group of client computing device comprises those client computing devices that are associated with the multiple different users who cast a vote.

14. The method of claim 12, wherein the predetermined group of client computing devices comprises those client computing devices that are associated with the multiple different users who cast a vote for the selected video media.

15. The method of claim 12, wherein the predetermined group of client computing devices comprises those client computing devices that are associated with users who receive an invitation from a user who cast a vote.

16. The method of claim 15, wherein the users who receive the invitation pay an invitee fee for receiving the selected video media that is less than a voter fee paid by the user who cast the vote.

17. The method of claim 5, wherein the broadcasting of the selected video media comprises streaming or downloading the selected video media to each of the multiple client computing devices.

18. The method of claim 5, wherein the broadcasting of the selected video media comprises broadcasting the selected video media in conjunction with advertisements that are related to the selected video media.

19. The method of claim 5, further comprising synchronizing playback of the selected video media amongst the multiple client computing devices during the broadcasting of the selected video media.

20. The method of claim 5, further comprising, following the broadcasting, offering the selected video media to viewers of the broadcast at a reduced fee.

21. One or more computer storage media having computer-readable instructions tangibly embedded thereupon that, when executed, direct one or more computing devices to perform acts comprising:

selecting a video media from multiple different video media;

receiving, from a purchaser, a request to purchase the selected video media for a purchaser fee;

associating a number of sharing credits with the purchaser to allow the purchaser to send a number of invitations limited to the number of sharing credits to users for viewing the selected video media, the number of sharing credits associated with the purchaser being based at least in part on an amount of the purchaser fee;

broadcasting the selected video media at a predetermined viewing time to a client computing device associated with the purchaser; and broadcasting the selected video media at the predetermined viewing time to other client computing devices associated with the users who have received an invitation from the purchaser.

22. The media as recited in claim 21, wherein the selecting the video media is based at least in part on votes received from a plurality of users, the votes comprising votes for one or more video media of the multiple different video media and votes for when to broadcast the selected video media.

23. The media as recited in claim 22, wherein the predetermined viewing time is determined based at least in part on the votes for when to broadcast the selected video media.

24. The media as recited in claim 21, wherein an amount of an invitee fee paid by the users who have received the invitation from the purchaser is based at least in part on an amount of the purchaser fee.

25. The media as recited in claim 21, further comprising offering the selected video media at a reduced fee to the users who have received the invitation.

26. The media as recited in claim 21, wherein the amount of the purchaser fee is based at least in part on a time that the purchaser purchased the selected video media relative to a release date of the selected video media.

27. The method of claim 5, wherein the multiple different users who are eligible to cast the media vote and the timing vote is limited to users who have previously purchased video media in a same genre as the selected video media.

\* \* \* \* \*